(12) United States Patent
Wilson et al.

(10) Patent No.: US 7,450,946 B2
(45) Date of Patent: Nov. 11, 2008

(54) SYSTEM AND METHOD FOR AUTOMATIC WIRELESS DETECTION AND IDENTIFICATION OF DOCUMENT PROCESSING SERVICE LOCATION

(75) Inventors: Silvy J. Wilson, Rancho Santa Margari, CA (US); Fabio Gava, Ladera Ranch, CA (US); Carl Byington, Lake Arrowhead, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 457 days.

(21) Appl. No.: 11/242,231

(22) Filed: Oct. 3, 2005

(65) Prior Publication Data

US 2007/0078994 A1    Apr. 5, 2007

(51) Int. Cl.
*H04Q 7/20* (2006.01)

(52) U.S. Cl. ............... 455/445; 455/418; 455/41.2; 370/328; 370/338; 358/1.15

(58) Field of Classification Search ........... 455/445, 455/418, 41.2; 370/328, 338; 358/1.15
See application file for complete search history.

(56) References Cited

U.S. PATENT DOCUMENTS

| | | | |
|---|---|---|---|
| 6,049,612 A | 4/2000 | Fielder et al. | |
| 6,888,811 B2* | 5/2005 | Eaton et al. | 370/338 |
| 6,895,255 B1* | 5/2005 | Bridgelall | 455/552.1 |
| 2002/0055924 A1 | 5/2002 | Liming | |
| 2002/0126840 A1 | 9/2002 | Robbins et al. | |
| 2003/0021417 A1 | 1/2003 | Vasic et al. | |
| 2003/0038963 A1 | 2/2003 | Yamaguchi | |
| 2003/0210424 A1 | 11/2003 | Sandfort et al. | |
| 2004/0085573 A1* | 5/2004 | Aidinejad | 358/1.15 |
| 2004/0137928 A1 | 7/2004 | Biundo | |
| 2004/0190042 A1 | 9/2004 | Ferlitsch et al. | |
| 2004/0203358 A1* | 10/2004 | Anderson et al. | 455/41.1 |
| 2005/0068574 A1 | 3/2005 | Ferlitsch | |

FOREIGN PATENT DOCUMENTS

WO    WO-99/17495    4/1999

* cited by examiner

*Primary Examiner*—Danh C Le
(74) *Attorney, Agent, or Firm*—Tucker Ellis & West, LLP

(57) ABSTRACT

A system and method for automated selection of a wireless document processing device. Data representing a plurality of available document processing devices is first generated on a wireless data processing device. The wireless data connection is then detected between a portable data device and an associated access point, wherein the access point is associated with at least one of the available document processing devices. Next, the at least one available document processing device is set as the default selection for performing document processing operations based on the detected wireless connection between the portable data device and the wireless access point associated with the at least one document processing device.

12 Claims, 2 Drawing Sheets

SYSTEM AND METHOD FOR AUTOMATIC WIRELESS DETECTION AND IDENTIFICATION OF DOCUMENT PROCESSING SERVICE LOCATION

BACKGROUND

This invention is directed to a system and method for mobile printing. More particularly, this invention is directed to a system and method for the automatic selection of a wireless document processing device.

Typically, users routinely work with documents or other data while away from their office environment. Such users need to generate image data, by printing a document, and then need to distribute or perform other functions on such image data. As the users are unable to carry document processing devices, such as multifunction peripheral devices, with them as they travel, various establishments include these devices for fee-based network access. These users generally use wireless client devices, such as laptop computers, personal data assistants, and the like, which enable the users to communicate with the service providers to facilitate the performance of operations on such image data. Web-based applications allow a user to print a document, or otherwise perform an image processing operation, to any one of the available service provider locations. A list of available service locations is ascertained and when initiating a document processing operation, the user is required to select one of the locations to perform the requested operation. When the user is already physically present at the service provider location, the inconvenience of having to manually select the output location, particularly when the user is accessing the location's wireless computer network, is generally unnecessary.

Thus, there is a need for a system and method that automatically selects the client device's location as the default selection for the performance of document processing operations.

SUMMARY OF INVENTION

In accordance with the present invention, there is provided a system and method for automatically selecting a location to perform document processing operations.

Further in accordance with the present invention, there is provided a system and method for determining the location of a client device and thereupon automatically setting the default document processing location.

Still further, in accordance with the present invention, there is provided a system and method for the automated selection of a wireless document processing device.

Further in accordance with the present invention, there is provided a system for automated selection of a wireless document processing device. The system includes generating means adapted to generate data representing a plurality of available document processing devices on a wireless data processing device. The system also includes detection means adapted to detect the wireless data connection between a portable data device and an associated wireless access point. The access point is associated with at least one of the plurality of available document processing devices. The system further includes setting means adapted to set the at least one document processing device as the default selection based on the detected wireless data connection with the access point associated with the at least one document processing device.

Still further, in accordance with the present invention, there is provided a method for automatically selecting a wireless document processing device. The method begins by generating, on a wireless data processing device, data representing a plurality of available document processing devices. The wireless data connection between a portable data device and an associated access point is then detected, wherein the access point is associated with at least one of the available document processing devices. Next, the at least one available document processing device is set as the default selection for performing document processing operations based on the detected wireless connection between the portable data device and the wireless access point associated with the at least one document processing device.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

The present invention is directed to a system and method for processing a document via a remote device. More particularly, the present system is directed to a system and method that enables the detection of a user accessing a web portal through a service provider location's wireless network to bypass a location selection page. Those skilled in the art will appreciate that the subject invention is not limited to the use of any single means of wireless communications, but rather is capable of employing any communications medium capable of enabling the communication between two electronic devices.

Figure 1:
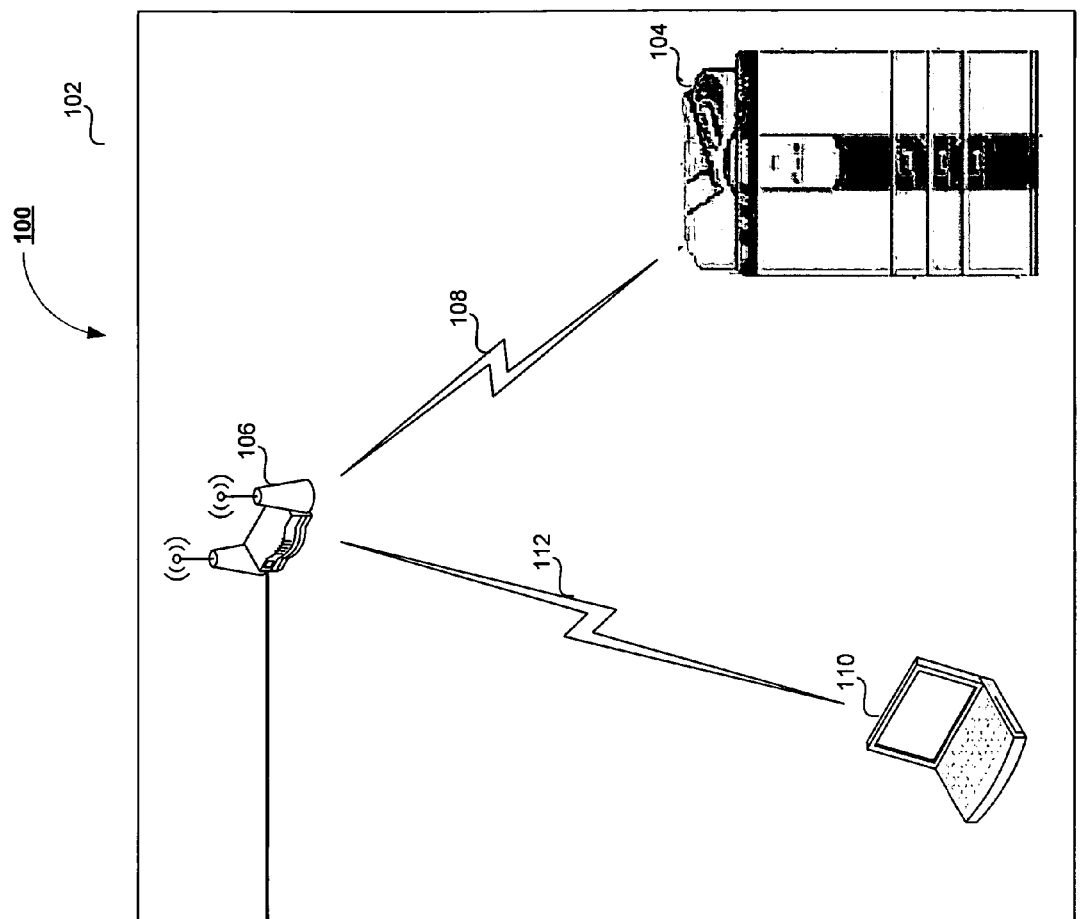
FIG. 1 is a block diagram illustrating a system in accordance with the present invention.
Figure 1:
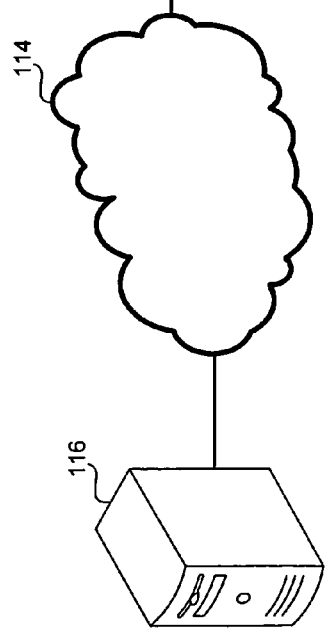

Turning now to FIG. 1, there is shown a block diagram illustrating a system 100 in accordance with the present invention. As shown in FIG. 1, the system 100 includes a service location 102 representative of a merchant location, kiosk, stall, stand, and the like, which provides document processing services. Preferably, the service location 102 is a non-office environment, such as an airport lounge or business center. Other non-office environment locations include, but are not limited to, university campuses, conference centers, libraries, third-party stores and hotels. Preferably, there are a plurality of service locations located throughout a given geographic area, such as a city, county, state, country, and the like, which are in data communication with each other. More preferably, each service location is capable of providing a user with document processing operations, such as, and without limitation, scanning a document, printing a document, storing a document, copying a document, faxing a document, retrieving a document from a storage location, retrieving a document from a storage device, and the like. In one embodiment, the user is assessed a fee associated with the performance of a selected document processing operation.

As shown in FIG. 1, the service location 102 suitably includes at least one document processing device, as illustrated by multifunction peripheral device 104, for receiving and processing electronic image files. It will be appreciated by those skilled in the art that document processing device is any suitable document processing device known in the art, such as a copier, printer, scanner, facsimile and the like, or any combination thereof. Suitable commercially available document processing peripherals include, but are not limited to, the Toshiba e-Studio Series Controller. The multifunction peripheral device 104 is suitably adapted to communicate with the Internet, or other computer data network.

As will be understood by those skilled in the art, the service location 102 suitably depicts a retail establishment configured to operate on a local computer network, illustrated in FIG. 1 by the access point/router 106. The skilled artisan will further appreciate that the router 106 enables wireless data communication with peripheral devices and client devices located within the specified zone of coverage. As is known in the art, the zone of coverage is dependent upon the type of wireless communications protocols employed by the router 106, such as for example and without limitation, Bluetooth, WiMax 802.11a, 802.11b, 802.11g, 802.11(x), infrared, optical, or any suitable wireless data transmission system. It will be appreciated by the skilled artisan that the router 106 is any router/wireless access point known in the art, capable of establishing wired and wireless communications channels with a variety of user and service location 102 devices.

As used herein, the terms "router", "access point" and "service location's network" each refer, in the preferred embodiment, to the local area network of the service location, illustrated in FIG. 1 as the access point/router device 106, and are used interchangeably throughout unless otherwise indicated. The multifunction peripheral device 104 suitably communicates with the computer network of the service location 102 via a communications link 108 with the router 106. As will be understood by those skilled in the art, the communications link 108 is any suitable communications channel between two electronic devices capable of carrying on data transmissions. The skilled artisan will appreciate that the communications link 108 is any data communications channel known in the art, including, but not limited to LAN, the Internet, directly via 802.11g (WiFi), WiMax, Bluetooth, optical, infrared, or other 802.11(x) wireless communications channels.

As shown in FIG. 1, the system suitably includes at least one client device 110, illustrated in FIG. 1 as a laptop computer. The skilled artisan will appreciate that the use of a laptop computer is for illustration purposes only, and the present invention is capable of employing any electronic computing device known in the art, including, without limitation, a desktop computer, a personal data assistant, a web-enabled telephone, a cellular-based portable data communication device, a Wi-Fi enabled portable data communication device, and the like.

In addition, the service location 102 is communicatively coupled to an external computer network 114 via any suitable means. Preferably, the external network 114 is a wide area network, such as the Internet. More preferably, the network 114 is comprised of a plurality of service locations communicating via the Internet. Each service location, represented by the service location 102, is in data communication with a web server 116. As will be understood by those skilled in the art, the single web server 116 is illustrative of any server known in the art and capable of facilitating communications between various service locations, hosting web pages, storing user data, storing customer information, handling billing transactions, and the like. In the preferred embodiment, the web server 116 hosts a mobile document processing service, which enables various users to remotely access, manipulate, store, and output image data. In this embodiment, a user first accesses the mobile document processing service via a web portal hosted by the web server 116. As used herein, the multifunction peripheral device 104 of the service location 102 is representative of an output location for the mobile document processing service. Stated another way, the multifunction peripheral device 104 is adapted to receive remote document processing commands transmitted from a user via the external network 114.

When a mobile user, illustrated as the client device 110, desires to output or otherwise use the mobile document processing service, the client device 110 establishes a connection with the network 114 requesting access to a predetermined web portal. The predetermined web portal is preferably a login page enabling the client device 110 to access the document processing capabilities of any of the service locations connected to the network 114. Once authenticated, the client device 110 is granted access to the mobile document processing service, preferably with rights and privileges set by an administrator and stored on the server 116. The client device 110 is then directed to a web portal on which are displayed the available service locations, from which the user selects the appropriate service location 102 to output or perform the desired document processing operations.

In accordance with the present invention, when the client device 110 accesses the network 114 via the router 106 over the communications link 112, the service location 102 is automatically selected as the default location to perform the desired operations. That is, when the client device 110 accesses the network 114 of available service locations via the service locations 102 wireless network (e.g., access point/router 106), that service location 102 is automatically set as the location to perform the desired document processing operations. The process by which the service location 102 is automatically selected as the default location to perform the desired document processing operation will be more fully understood in connection with the flow chart 200 illustrated in FIG. 2.

Figure 2:
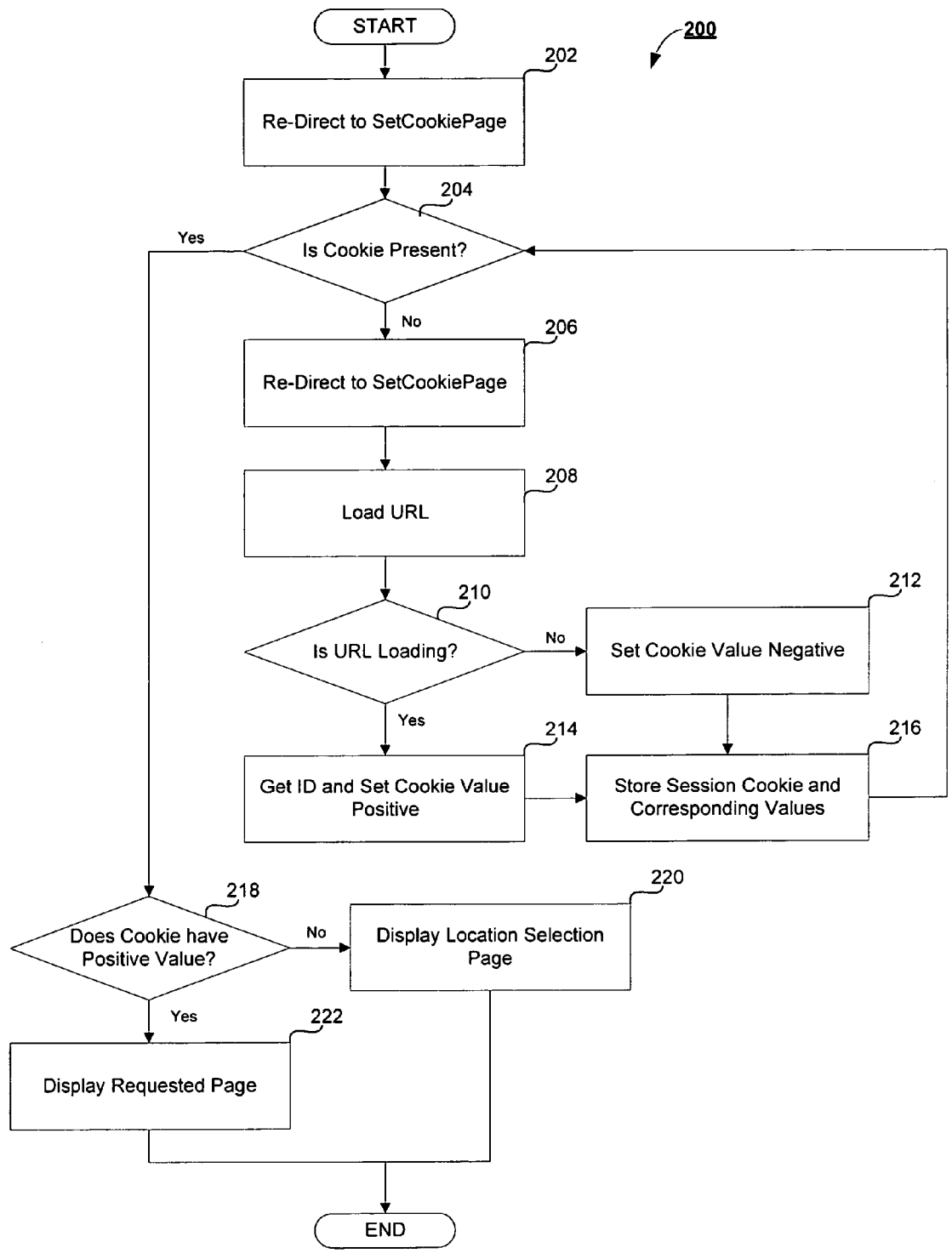
FIG. 2 is a flow chart illustrating a method in accordance with the present invention.

Turning now to FIG. 2, there is shown the flow chart 200 illustrating the method for automatic selection of the default location in accordance with the present invention. The method begins at step 202 wherein the client device 110 establishes a connection with the web server 116 using a web browser. The web browser employed by the client device 110 is any suitable interface, such as web browser known in the art, including, without limitation, Microsoft Internet Explorer, Opera, Netscape Navigator, Mozilla, Mozilla Firefox, and the like. As shown in FIG. 1, the client device 110 is capable of communicating with the web server 116 using the wireless network (e.g., router 106) of the service location 102. Preferably, the client device 110 is required to provide authentication information via any suitable means prior to proceeding with requesting document processing operations.

Upon successful login and authentication, the server 116 determines at step 204, whether or not a specific cookie is present in the memory of the web browser employed by the client device 110. As will be understood by those skilled in the art, a "cookie" is a packet of information sent by a server to a web browser and then sent back by the browser each time the browser accesses the server. Cookies are capable of containing any selected information, such as user preferences, items in a shopping cart, privacy settings, usage data, and the like.

As used by the present invention, the particular cookie in question that is looked for is a service location identification cookie. When the cookie is not present at step 204, flow proceeds to step 206, wherein the browser used by the client device 110 is redirected to a set cookie page hosted by the web server 116.

Upon reaching the set cookie page, the browser is prompted to access, i.e., load, a predetermined uniform resource locator on a predetermined port at step 208. A determination is then made at step 210 whether or not the predetermined uniform resource locator is accessible. When not accessible, the service location identification cookie is initiated with a negative value at step 212. This cookie is then stored at step 216 as a session cookie in the client device 110 web browser cache. When the uniform resource locator is accessible at step 210, flow proceeds to step 214, wherein the service location identification cookie is initiated with a positive value. This session cookie is then stored at step 216 in the client device 110 web browser cache. It will be understood by those skilled in the art that a client device 110 connected to the network 114 through the service location 102 router 106 will be able to access the predetermined uniform resource locator, while those connected via some other means, i.e., a remote user accessing the service location 102 via the network 114, will not be able to retrieve the uniform resource locator.

It will be understood by those skilled in the art that in order to determine whether the user is connected through a service location's wireless network, the client side code present in the set cookie page, directs the client device 110 to attempt to access a uniform resource locator (e.g., http://domain-name:port-number/file-name) which provides a valid service location identification cookie in the case of those clients connected via the wireless network. When the uniform resource locator is not found, i.e., the requesting client device is not accessing the service location's network, the service location identification cookie is set to a negative value, such as −1. Irrespective of the value entered for the cookie, the value is advantageously stored as an in-memory cookie for the rest of the session. The originally requested page is passed in as a query string to the page that sets the cookie. This action is usually fast and is transparent to the user. The domain-name used in the uniform resource locator is the same as the one that is used to access the web portal. Port redirection is used to forward the requests to the proper servers. At each location's network there is a dynamic host configuration protocol (DHCP) server (not shown), a domain name system (DNS) server (not shown) and a web server (not shown).

As will be appreciated by those skilled in the art, the DHCP is a protocol that provides a means to dynamically allocate Internet protocol (IP) addresses to computers on a local area network. The system administrator assigns a range of IP addresses to DHCP and each client computer on the LAN has its TCP/IP software configured to request an IP address from the DHCP server. The request and grant process uses a lease concept with a controllable time period. The skilled artisan will further appreciate that the DNS is a general purpose, distributed, replicated, data query service chiefly used on the Internet for translating host names into IP addresses.

In operation, wireless clients, such as the client device 110, are configured by DHCP running on the service location network 106 and use the service location's DNS server for name resolution. In one embodiment, the web portal domain name resolves to the location itself. Wireless clients are configured by DHCP running on the location 102 and use the location's DNS server for name resolution. At the location's wireless network 106, the web portal domain name resolves to the location itself. The location's web server is configured in such a way that all hypertext transfer protocol requests coming in on ports 80 and 443, are redirected to the actual backend web server 116.

As will be appreciated by those skilled in the art, port 80 is representative of the port on a web server or hypertext transfer protocol daemon, which the server "listens to" or expects to receive data from a web client, assuming that the default was taken when the server was configured or set up. A typical port can be specified in the range from 0-65536 on the server in present day implementations. However, the server administrator configures the server so that only one port number can be recognized. By default, the port number for a web server is 80. Accordingly, the subject invention is not limited solely to the use of port 80 and any other port designated by the administrator is equally capable of being employed. In addition, port 443, also known as secure hypertext transfer protocol, is used for secure web browser communications.

The request for the service location identification cookie value is received on a predetermined port. Clients on the location's wireless network 106 will get a valid (positive) service location identification cookie value as the response to this request. No other user will be able to access this resource at this uniform resource locator. The set cookie page sets the cookie to be the valid service location identification cookie value returned by the location's web server. For client devices not connected through a location's wireless network, the cookie is set to be a predetermined negative value. Once the cookie has been set, the 'location selection' page is skipped depending on whether the cookie is a positive value or not. It will further be appreciated by those skilled in the art that the each service location has a unique corresponding service location identification value associated therewith, that enables the web server 116 to determine in which of the plurality of service locations the client device 110 is located.

From step 216, flow returns to step 204, wherein a determination is made that the service location identification cookie is present on the client device 110 accessing the web portal. The positive determination at step 204 prompts the determination, at step 218, whether or not the service location identification cookie has a positive value. In other words, a determination is made at step 218 whether or not the requesting client device is accessing the web portal using the wireless network of one of the service locations. When the value of the service location identification cookie has a negative value at step 218, flow proceeds to step 220, wherein the user is prompted to select the desired service location to perform a document processing operation. When the service location identification cookie value indicates that the client device 110 is located at one of the service locations, such as at service location 102, then that location (102) is automatically selected and flow proceeds to step 222, wherein the requested page, i.e., the document processing operations selection page, is displayed, with the service location 102 set as the default location to perform any requested document processing operations.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for automated selection of a wireless document processing device comprising:
    means adapted for generating, web page, data representative of a plurality of available document processing devices;
    means adapted for detecting a wireless data connection between a wireless data processing device and an associated wireless access point, which wireless access point is associated with a common local area network associated with at least one document processing device included in the plurality thereof and the web page;
    means adapted for generating browser session on a browser disposed on the wireless data processing device in accordance with a detected wireless data connection;
    means adapted for generating, on the wireless data processing device, a cookie corresponding to a generated browser session;
    means adapted for directing the browser to a web page in accordance with a generated cookie; and
    means adapted for setting the at least one document processing device in accordance with the plurality of available document processing devices in the web page as a default selection from the plurality thereof in accordance with a detected wireless data connection with the wireless access point associated with the at least one document processing device.

2. The system for automated selection of a wireless document processing device of claim 1, further comprising:
    means adapted for selectively initiating communication of an electronic document from the wireless data processing device to the at least one document processing device.

3. The system for automated selection of a wireless document processing device of claim 2, further comprising means adapted for commencing operation of the at least one document processing device on the electronic document.

4. The system for automated selection of a wireless document processing device of claim 3, further comprising means adapted for receiving user input altering the default selection from the at least one document processing device to a unique document processing device representative in the plurality thereof.

5. A method for automated selection of a wireless document processing device comprising the steps of:
    generating, on a web page inclusive of; data representative of a plurality of available document processing devices;
    detecting a wireless data connection between a portable data device and an associated wireless access point, which wireless access point is associated with a common local area network associated with at least one document processing device included in the plurality thereof and the web page;
    generating browser session on a browser disposed on the wireless data processing device in accordance with a detected wireless data connection;
    generating, on the wireless data processing device, a cookie corresponding to a generated browser session;
    directing the browser to a web page in accordance with a generated cookie; and
    setting the at least one document processing device in accordance with the plurality of available document processing devices in the web page as a default selection from the plurality thereof in accordance with a detected wireless data connection with the wireless access point associated with the at least one document processing device.

6. The method for automated selection of a wireless document processing device of claim 5, further comprising the step of selectively initiating communication of an electronic document from the wireless data processing device to the at least one document processing device.

7. The method for automated selection of a wireless document processing device of claim 6, further comprising the step of commencing operation of the at least one document processing device on the electronic document.

8. The method for automated selection of a wireless document processing device of claim 7, further comprising the step of receiving user input altering the default selection from the at least one document processing device to a unique document processing device representative in the plurality thereof.

9. A computer-readable medium of instructions with computer-readable instructions stored thereon for automated selection of a wireless document processing device comprising: instructions for generating, on a , web page inclusive of data representative of a plurality of available document processing devices;
    instructions for detecting a wireless data connection between a portable data device and an associated wireless access point, which wireless access point is associated with a common local area network associated with at least one document processing device included in the plurality thereof and the web page;
    instructions for generating browser session on a browser disposed on the wireless data processing device in accordance with a detected wireless data connection:
    instructions for generating, on the wireless data processing device, a cookie corresponding to a generated browser session:
    instructions for directing the browser to a web page in accordance with a generated cookie: and
    instructions for setting the at least one document processing device in accordance with the plurality of available document processing devices in the web page as a default selection from the plurality thereof in accordance with a detected wireless data connection with the wireless access point associated with the at least one document processing device.

10. The computer-readable medium of instructions with computer-readable instructions stored thereon for automated selection of a wireless document processing device of claim 9, further comprising instructions for selectively initiating communication of an electronic document from the wireless data processing device to the at least one document processing device.

11. The computer-readable medium of instructions with computer-readable instructions stored thereon for automated selection of a wireless document processing device of claim 10, further comprising instructions for commencing operation of the at least one document processing device on the electronic document.

12. The computer-readable medium of instructions with computer-readable instructions stored thereon for automated selection of a wireless document processing device of claim 11, further comprising instructions for receiving user input altering the default selection from the at least one document processing device to a unique document processing device representative in the plurality thereof.

* * * * *